Figure 1:
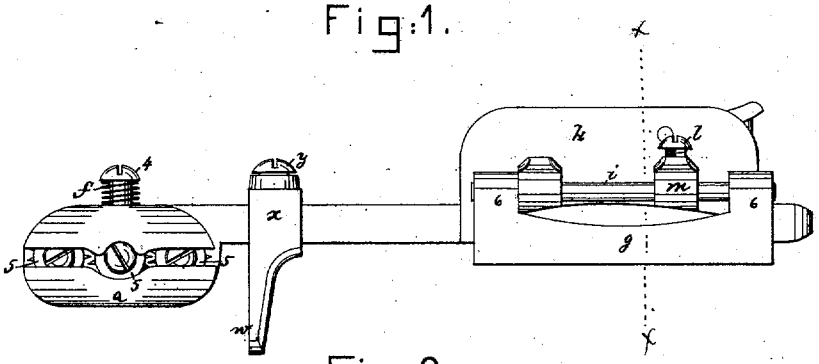

W. H. BURNS.

Assignor, by mesne assignments, to J. H. PROUTY & S. S. SPRAGUE.

Loom-Temple.

No. 8,957. Reissued Nov. 4, 1879.

Witnesses.

Jos. P. Livermore

Lawrence F. Connor

Inventor.

William Henry Burns, by Crosby & Gregory Attys

N. PETERS, PHOTO-LITHOGRAPHER, WASHINGTON, D. C.

UNITED STATES PATENT OFFICE.

WILLIAM HENRY BURNS, OF WORCESTER, MASSACHUSETTS, ASSIGNOR, BY MESNE ASSIGNMENTS, TO JOEL H. PROUTY AND SOLON S. SPRAGUE, OF SAME PLACE.

IMPROVEMENT IN LOOM-TEMPLES.

Specification forming part of Letters Patent No. 192,897, dated July 10, 1877; Reissue No. 8,957, dated November 4, 1879; application filed March 26, 1879.

DIVISION B.

*To all whom it may concern:*

Be it known that I, WILLIAM HENRY BURNS, of Worcester, in the county of Worcester and State of Massachusetts, have invented certain new and useful Improvements in Loom-Temples; and I do hereby declare the following to be a full, clear, and exact description thereof, reference being had to the accompanying drawings and to the letters and figures of reference marked thereon.

This invention relates to loom-temples; and it consists chiefly in the combination, with the bar of the temple, of a socketed heel adjustably attached thereto between the temple-head and the temple-stand, the said socket, by embracing the said bar, acting to strengthen rather than weaken the bar, as is the case in those temples in which the heels are attached at one side of the bar by screws, as is now common. The socket embracing the bar makes the whole thickness of the bar useful to resist breakage.

In the common bar-temple, such as represented in United States patent to Dutcher, No. 17,559, the heel, or that part which is struck by the lay, is connected with a plate extended backward from the temple head or trough, the head forming an integral part with the bar. This heel is extended backward below the bar at the rear of the head, and is also placed at one side of the path of movement of the bar, and also at one side of its center, and the blow of the lay against it strains the bar greatly just back of its connection with the head, and, consequently, said bar is frequently broken at that point; and, further, the heel struck by the lay being at one side of the center of the bar, results in twisting and tipping the bar in the stand, which wears away the corners of the bar unevenly. To obviate this breaking and wearing of the bar the heel is, in this instance, transferred from the plate below the head directly to the bar at a point back of the head, the socket of the heel surrounding and embracing the strong portion of the bar between the stand and head, receiving the direct thrust of the lay, without tendency to bend the said bar, or twist or turn it in the stand in which it reciprocates.

I am aware that the heel has been cast directly upon and so as to extend below the bar. This heel is provided with a socket and a clamp or set-screw, by which it may be clamped upon the bar in any desired adjusted position, provision being made, however, to allow of sufficient space between the heel and stand for the reciprocation of the temple.

If the screw which holds the heel in position entered a hole in the bar, said bar would be so much weakened as to render a bar of usual size too weak for service.

Figure 2:
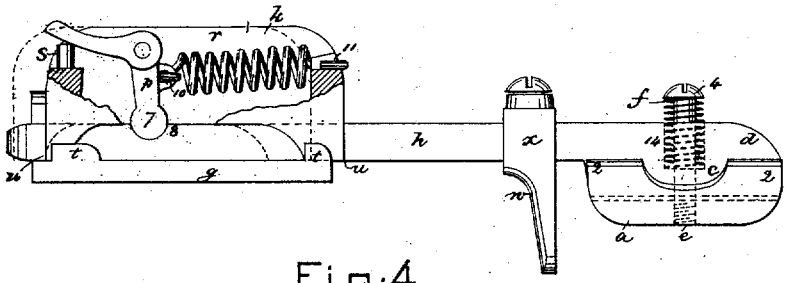
Figure 4:
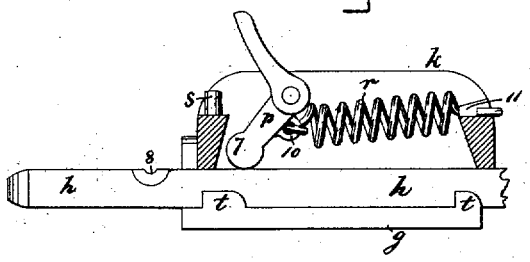
Figure 3:
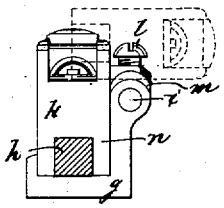
Figure 5:
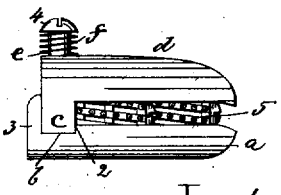

Figure 1 represents one of my improved temples in side elevation; Fig. 2, an opposite side view thereof, the top part of the stand being shown in dotted lines as moved back for the removal of the bar from the stand. Fig. 3 is a section on line *x x*, Fig. 1, showing the stand closed upon the bar, and opened in dotted lines. Fig. 4 is a detail to be referred to, and Fig. 5 is a front end view of the head only.

The trough *a*, forming part of the temple-head, is made in a separate piece, and has a groove, *b*, and shoulders 2 3, which fit a guiding ledge or rib, *c*, upon the cap part *d* of the head. A stud, *e*, connected with the trough, projects upward through a hole in the cap, where it receives a spring, *f*, which, acting against the head 4 of the stud *e*, holds the trough up in position and the cloth against the temple-roller 5.

To facilitate the insertion or removal of the cloth, the trough may be depressed by pressing the stud downward.

The base *g* of the stand in which the bar *h* reciprocates is bolted or screwed to the breast-beam in the ordinary manner by means of screws passed through holes in the said base. This base has ears 6, which receive a rod, *i*, upon which is pivoted the top part, *k*, of the stand, it being held in position against longitudinal movement by means of a screw, *l*, in an ear, *m*, projected from *k*. This top part, *k*, is provided with a groove or way, *n*, for the reception of the temple-rod *h*, and with a finger, *p*, which is shown with its end 7 rounded to enter a notch, 8, in the bar *h*.

The finger is connected at 10 with one end of a strong spring, *r*, which is joined at its other end with the top part of the frame at 11, and acts to draw the lever in such direction as to press the bar and head forward toward the lay of the loom.

The independent stop *s* co-operates with the finger *p*, and acts to determine the extent of forward motion of the head and bar, and it is obvious that the said bar cannot move forward after the end of the finger next the said stop strikes it, as in Fig. 2.

The base of the stand is provided with lugs *t*, and the top part, *k*, with projections *u*, so that when the projections and lugs are in contact the top part cannot be turned upon the rod *i*, but when the screw L is loosened and the top part is moved back (see dotted lines, Fig. 2) far enough to pass the projections *u* beyond the lugs *t*, then the top part may be turned on the rod *i* or its pivot, and the bar *h* may be quickly removed from the stand. (See Fig. 3.)

The heel *w* has a socket, *x*, cast at one end of it to embrace the bar *h*, and be adjustable thereon by reason of the screw *y*. The lower end of the spring rests upon a portion, 14, of the cap.

The end 7 of the finger, controlled by the spring *r*, when in engagement with the notch of the bar *h*, holds the bar in a yielding manner, so that it may be moved forward promptly after being operated upon or moved backward by the lay.

When for any purpose it is desired to disengage the bar from the control of the finger and spring to permit the head and roller to be moved backward toward the breast-beam and remain there, it is only necessary to disengage the finger *p* from the bar *h*, that being done, as herein shown, by simply moving the bar backward beyond its usual backward position when operated regularly by the lay.

I claim—

1. The combination, in a loom-temple, of a temple-roller carrying-bar provided with a notch at one side, a finger to enter the said notch, a spring to hold the finger and bar pressed forward, a stop connected with the temple-stand to limit the forward movement of the finger, and thereby of the temple-bar, the finger being connected with the bar, substantially as described, to permit the bar to be removed from the control of the spring, and a guiding-stand for the temple-bar to hold and prevent it being lifted from the guiding-stand after the disengagement of the finger from the bar, substantially as set forth.

2. In a reciprocating bar-temple, the combination, with the bar and the stand in which it slides, of a heel having a socket to embrace or surround the bar, the socket being made adjustable thereon, substantially as described.

3. In a loom-temple, the combination, with a cap and a bar and a trough having a guiding ledge and shoulders, of a stud carried by the trough, and a roller, and a spring upon the stud to permit the trough to be moved vertically with relation to the rollers and cap by pressure upon the stud, substantially as described.

4. The temple-bar combined with the base *g* of the stand and the pivoted top part, *k*, substantially as described.

5. The temple bar and stand and top part, *k*, combined with the finger and its spring and a stop to regulate the forward position of the temple-bar, substantially as described.

6. In a loom-temple, the base provided with the lugs, combined with the top part, provided with the ears and made longitudinally movable with relation to the base, to enable the top part to be turned over to remove the bar, substantially as described.

7. The base of the stand and its rod, combined with the top part, pivoted thereon, and the sleeve *m*, provided with the set-screw, whereby the top part is held in position or permitted to be moved longitudinally and turned, substantially as described.

WILLIAM HENRY BURNS.

Witnesses:
C. H. ROBINSON,
CHARLES A. KING.